April 14, 1942.　　　A. JACKSON　　　2,279,464
RAMP FOR AUTOMOBILES
Filed April 15, 1940

ALEXIS JACKSON
INVENTOR.
BY John P. Wilson
ATTORNEY

Patented Apr. 14, 1942

2,279,464

UNITED STATES PATENT OFFICE 2,279,464

RAMP FOR AUTOMOBILES

Alexis Jackson, Rochester, N. Y., assignor to Vadim S. Makaroff, New York, N. Y.

Application April 15, 1940, Serial No. 329,671

1 Claim. (Cl. 254—88)

My invention relates to ramps for automobiles and has particular reference to ramps for raising one end of an automotive vehicle.

For repair and maintenance work on automobiles and other automotive vehicles, it is often necessary to employ special lifting jacks which can raise the front or rear axle of the vehicle to a relatively high elevation, thereby placing the vehicle in a steeply inclined position. Certain types of vehicles, particularly passenger automobiles, are not designed for such an inclination, having low overhanging rear and front portions, such as fenders, bumpers, etc.

My invention has for its object, therefore, to provide means to raise the wheels of an automobile at one end before applying the jack to the other end, so that the fenders, bumpers, and other low hanging parts will not touch the ground. I provide for this purpose a relatively small portable ramp, preferably separate for each wheel, the ramp having an inclined surface at one end and a raised portion at the top of the ramp with a small recess in the middle so that when an automobile is driven over the ramp, the wheel takes position in the recess at an elevation above the ground. The ramp ends abruptly and is provided with a stop to prevent overdriving the automobile.

My invention is more fully described in the accompanying specification and drawing in which.

Figure 1:
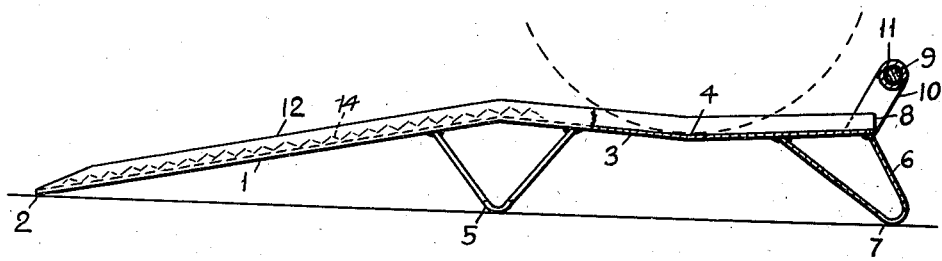
Fig. 1 is an elevational view of my ramp partly in section.
Figure 2:
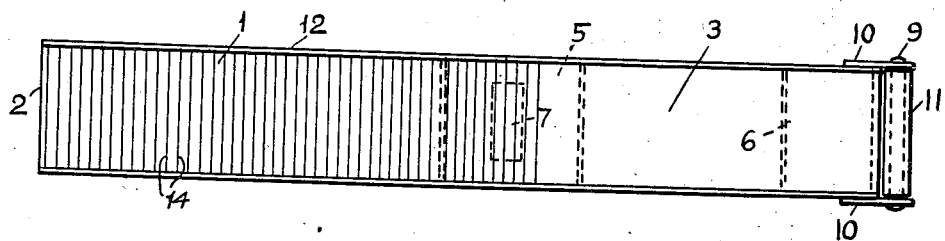
Fig. 2 is a top plan view of the same.
Figure 3:
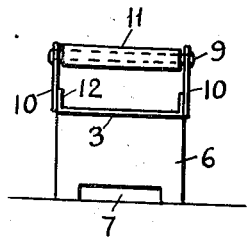
Fig. 3 is an end view of the same.
Figure 4:
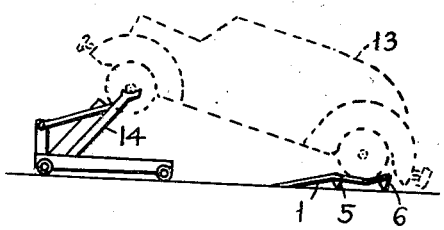
Fig. 4 is a diagrammatic view of my ramp used in connection with an automobile raised at the other end by a jack.

My ramp consists of a steel plate 1 resting on the ground at its end 2. It is inclined at a small angle to the ground, leading to a raised platform 3 which is somewhat depressed in the middle at 4. The raised portion is supported on legs 5 and 6, preferably made of sheet metal and welded or otherwise attached to the under side of the plate 1. Recesses 7 are provided at the lower ends of the legs for facilitating leveling of the legs on the ground. The leg 6 extends beyond the raised end 8 of the damp in order to increase its stability when the wheel of a vehicle shown in dotted lines in Fig. 1 is placed on the ramp. One such ramp is placed in front of each wheel of an automobile 13, Fig. 4, and the automobile is driven over the inclined portion of the ramp until the wheels come to rest in depressed portions 4 of the raised platforms 3, as shown in dotted lines in Figs. 1 and 4. A stop is provided at the raised end of the ramp consisting of a rod 9 held at its ends in brackets 10 extending from the end of the platform 3. A tube or roller 11 is mounted on the rod 9 with a clearance, so that it can freely rotate on the rod, preventing the wheel of an automobile from climbing over the roller. Flanges 12 are provided at the sides of the plate 1 for guiding the wheel.

The raised platform 3 is relatively short so that fenders, bumpers, and other overhanging end portions of the automobile extend beyond the end 8 of the ramp. With the wheels of an automobile thus placed on the raised platforms 3, the other end of the automobile can be raised by a jack 14, Fig. 4. The overhanging ends of the fenders will not touch the ground, even if they are lowered below the wheels by raising the other end of the automobile.

The automobile is driven forward on the ramps placed under the front wheels, if it is desired to jack up the rear end, or is backed over the ramps placed under the rear wheels, if it is desired to jack up the front end of the automobile.

My ramp has an added advantage in that it increases the stability of a vehicle when its one end is raised. By making the ramp relatively high, it is possible to raise the vehicle to a sufficiently high elevation for facilitating the repair or maintenance work under the chassis.

The surface of the ramp may be roughened or corrugated in any known manner, so as to prevent slippage of the wheels.

It is understood that my ramp may be further modified, without departing from the spirit of my invention, as set forth in the appended claim.

I claim as my invention:

A ramp for an automobile comprising an elongated plate having flanges at the sides, one end of the plate resting on the ground, the other end being raised, the plate extending at a small angle from the grounded to the raised portions, the raised portion having a depression in the middle for a wheel of a vehicle, legs under the raised portion made of U-shaped pieces of sheet metal, the ends of the pieces being fastened to the under side of the plate, the bent portions of the U-pieces resting on the ground, and means at the outer end of the raised portion to stop the wheel from rolling off the outer end of the raised portion.

ALEXIS JACKSON.